(12) United States Patent
Hojsgaard

(10) Patent No.: US 8,318,026 B2
(45) Date of Patent: Nov. 27, 2012

(54) GRIT CHAMBER AND A METHOD FOR CONTROLLING THE SAME

(75) Inventor: Soren Johannes Hojsgaard, Hillerod (DK)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 494 days.

(21) Appl. No.: 12/528,918

(22) PCT Filed: Feb. 15, 2008

(86) PCT No.: PCT/EP2008/051856
§ 371 (c)(1),
(2), (4) Date: Sep. 29, 2009

(87) PCT Pub. No.: WO2008/099004
PCT Pub. Date: Aug. 21, 2008

(65) Prior Publication Data
US 2010/0038321 A1 Feb. 18, 2010

(30) Foreign Application Priority Data
Feb. 15, 2007 (DK) .................................. 2007 00242

(51) Int. Cl.
*B01D 21/00* (2006.01)
*C02F 1/52* (2006.01)
(52) U.S. Cl. ........ 210/742; 210/739; 210/767; 210/800; 210/801; 210/103; 210/170.06; 210/513

(58) Field of Classification Search ................... 210/740, 210/742, 103, 170.06, 513, 739, 767, 800, 210/801
See application file for complete search history.

(56) References Cited

U.S. PATENT DOCUMENTS

| | | | |
|---|---|---|---|
| 2,245,587 A | 6/1941 | Huges | |
| 2,660,305 A | 11/1953 | Labouygues | |
| 3,170,868 A | 2/1965 | Atkinson | |
| 3,244,280 A | 4/1966 | Lind et al. | |
| 3,297,567 A | 1/1967 | Tapleshay | |
| 3,941,698 A * | 3/1976 | Weis | 210/208 |
| 4,670,142 A | 6/1987 | Lowry | |
| 5,616,831 A | 4/1997 | Ferland et al. | |
| 5,716,519 A | 2/1998 | Schleife et al. | |

* cited by examiner

*Primary Examiner* — Nam Nguyen
*Assistant Examiner* — Paul J Durand
(74) *Attorney, Agent, or Firm* — Coats & Bennett, P.L.L.C.

(57) ABSTRACT

A system for controlling the sedimentation of sand or grit particles suspended in waste water contained in a grit chamber by determining the temperature of water contained in the grit chamber and by operating a turbulence creating means on the basis of the water temperature. A method of controlling the sedimentation of sand and grit particles suspended in waste water contained in a grit chamber, by determining the temperature of water contained in the grit chamber and by operating a turbulence creating means on the basis of the water temperature.

29 Claims, 5 Drawing Sheets

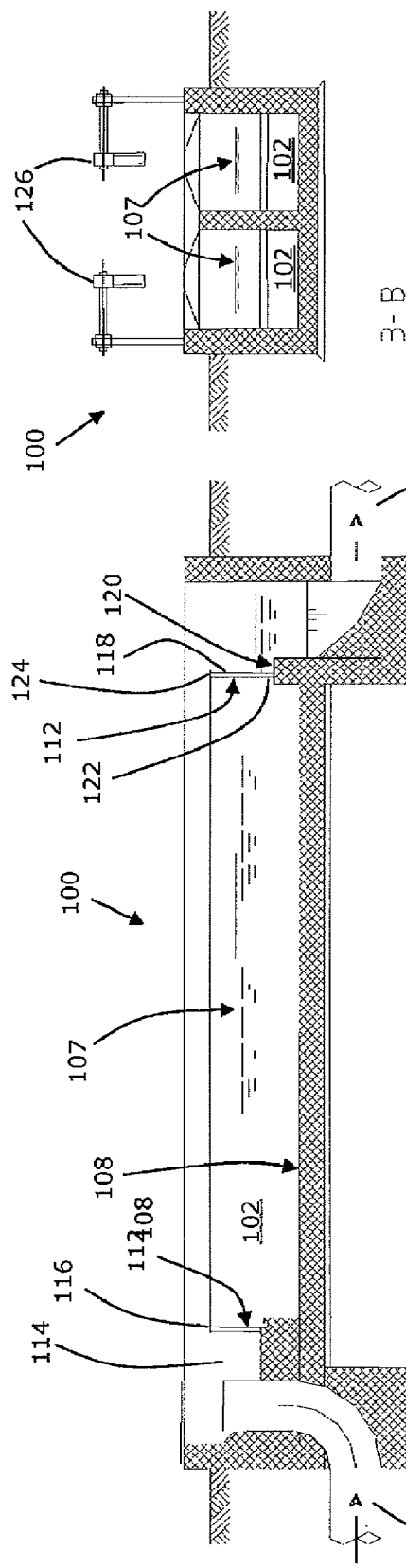
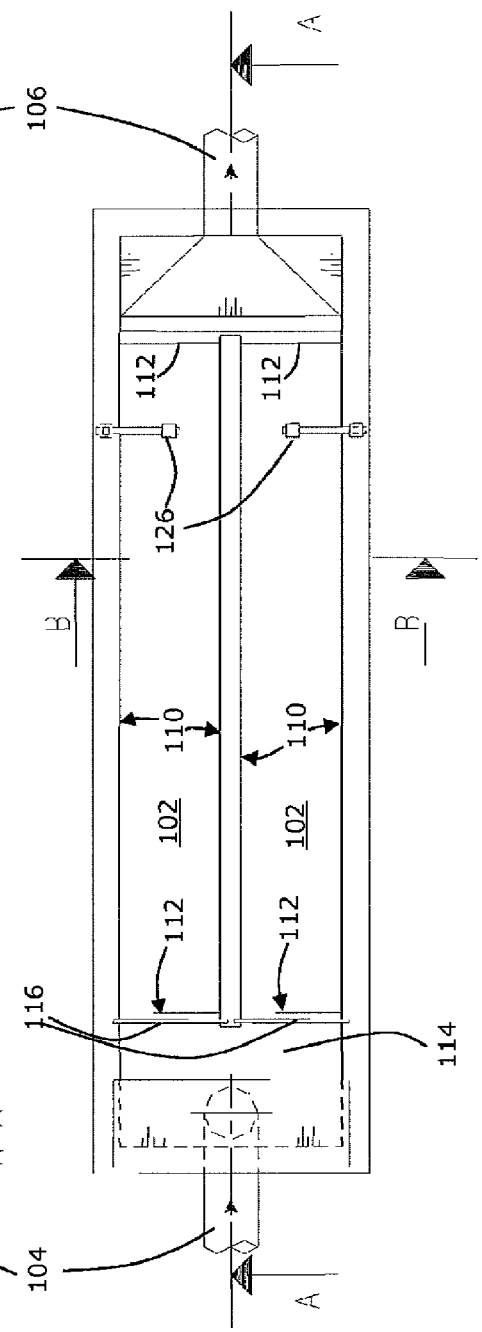

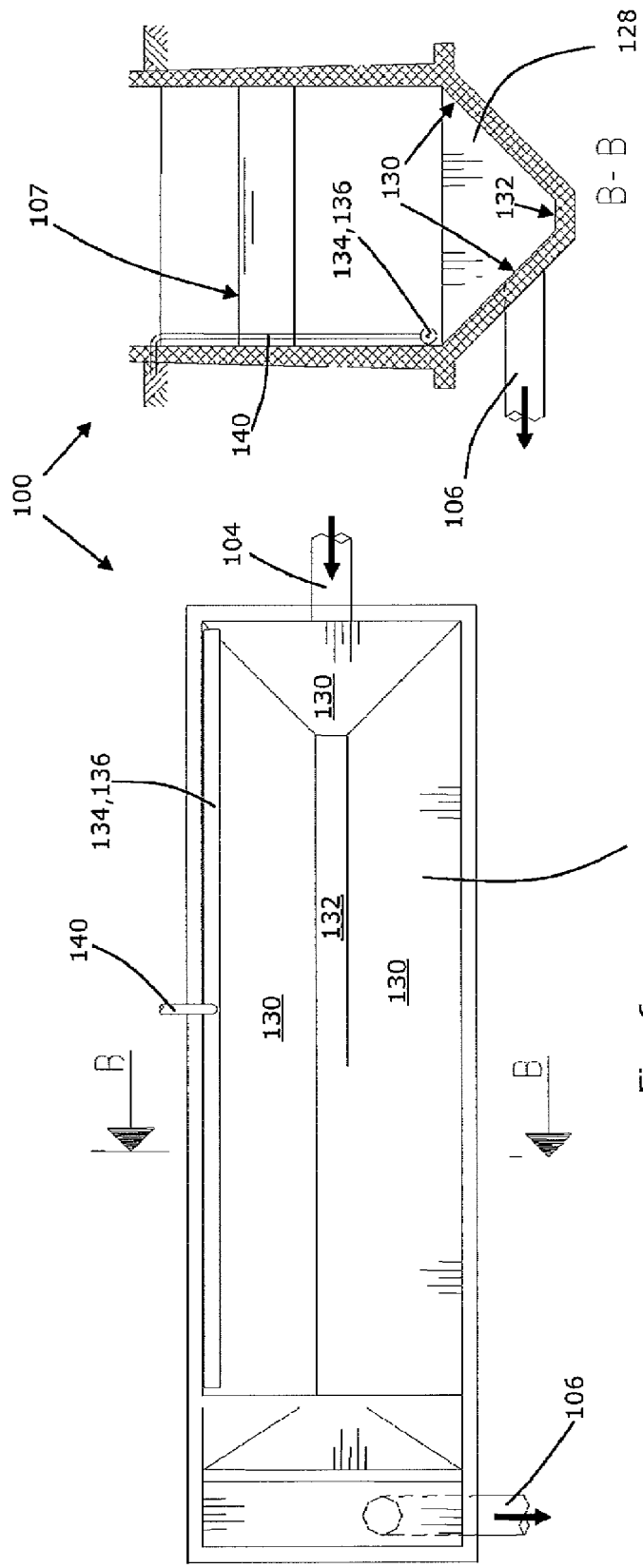

GRIT CHAMBER AND A METHOD FOR CONTROLLING THE SAME

This application is a U.S. National Stage Application of PCT Application No. PCT/EP2008/051856, with an international filing date of 15 Feb. 2008. Applicant claims priority based on Danish Patent Application No. PA 2007 00242 filed 15 Feb. 2007. The subject matter of these applications is incorporated herein.

FIELD OF THE INVENTION

The present invention relates to a system for controlling the sedimentation of sand and/or grit particles suspended in waste water contained in a grit chamber. In particular the present invention relates to system which is adapted to allow as much organic material to pass through the system for a given sedimentation threshold. Moreover, the present invention relates to a method of controlling the sedimentation of sand and/or grit particles suspended in waste water contained in a grit chamber.

BACKGROUND OF THE INVENTION

Methods and apparatuses for treatment of water are known in the art.

One such example is known from U.S. Pat. No. 3,170,868 which discloses a method and an apparatus for treating and agitating water in a reactor. The apparatus comprises means for adding a flocculation agent such that solids may be formed and separated in the reactor. The apparatus of U.S. Pat. No. 3,170,868 is controlled by determining the temperature upstream and downstream the reactor and determining the temperature difference upon which the agitation of the water is controlled. Alternatively, the system according to U.S. Pat. No. 3,170,868 is controlled on the basis of the turbidity of the water or the density of the water.

Further background art may be seen in U.S. Pat. No. 3,244,280, U.S. Pat. No. 4,670,142, U.S. Pat. No. 3,297,567, U.S. Pat. No. 5,616,831, U.S. Pat. No. 2,245,587 and U.S. Pat. No. 5,716,519.

It has been found that as conventional waste water treatment systems are operated in temperature ranges between 0 and 30 degrees Celsius, the density of water is substantially constant. This is illustrated in FIG. 11 and described in the description relating thereto.

Moreover it has been found that the turbidity of water is primarily determined by the level of organic material in the water (up to 99 percent of the turbidity being created by organic material) and not the level of sand/grit in the water.

Furthermore, it has been found that in waste water treatment systems the difference in temperature between a point upstream the sedimentation chamber and a point downstream the sedimentation chamber is insignificant. Most surprisingly it has been found to be the case for all temperatures of the year. Accordingly, no or little natural convection occurs in such chambers, as the waste water flowing into the chamber has substantially the same temperature as the water which flows out of the chamber. It has been found that for normal operating temperature (0-30 degrees Celsius) of the waste water, the difference between the temperature of water flowing into and out of the chamber is less than 0.1 degree Celsius.

In order to separate sand and/or grit from waste water, waste water treatment plants often comprise a grit chamber. During operation sand and grit containing waste water flows into the grit chamber which is designed to allow the sand and grit to settle at the bottom/floor of the chamber. In order to ensure that sand/grit particles larger than a predetermined size settles on the floor of the grit chamber, and that particles such as sand, grit and organic particles, smaller than the predetermined size are allowed to leave the grit chamber by being suspended in the waste water, grit chambers may comprise diffusers for increasing the turbulence in the waste water.

However a certain degree of turbulence is needed in order to prevent most of the organic material from settling in the grit chamber, while allowing sand/grit to settle.

Accordingly, it is an object of a preferred embodiment of the present invention, to provide a system for controlling the sedimentation of sand and/or grit particles in a grit chamber.

Especially, it is an object of a preferred embodiment of the present invention to provide a system wherein as much organic material is transported through the grit chamber while as much sand and grit is allowed to settle in the grid chamber.

Moreover it is an object of a preferred embodiment of the present invention, to provide a system which is adapted to maintain substantially the same level of sedimentation for a predetermined period of time such as at least one year or such as at least one season during which the temperature varies.

Moreover, it is an object of a preferred embodiment of the present invention to provide a system wherein the amount of sand in the subsequent process tanks is reduced.

It is an object of a preferred embodiment of the present invention to provide a system which is adapted to allow as much organic material to pass though the system as possible for a given sedimentation threshold i.e. for a given maximum size of the largest particle allowed to be transported through the chamber/reservoir.

Furthermore, it is an object of a preferred embodiment of the present invention to provide a system wherein tear and wear of e.g. pipes and pumps is reduced. Moreover, it is an object of a preferred embodiment of the present invention to provide a system wherein the capacity of process tanks subsequent to the grit chamber is increased.

Additionally, it is an object of a preferred embodiment to provide a grit chamber wherein the turbulence created by means of the diffusers is more uniform along the length of the grit chamber. Furthermore, it is an object of an embodiment of the present invention to reduce power consumption of grit chambers with turbulence creating means.

BRIEF DESCRIPTION OF THE INVENTION

In a FIRST aspect the present invention relates to a system for controlling sedimentation of sand and/or grit particles suspended in waste water contained in a grit chamber which comprises:
  a reservoir adapted to contain waste water and having an inlet and an outlet, and
  a turbulence creating means for increasing the turbulence in waste water contained in the reservoir, and
  a water temperature sensor for determining the temperature of waste water contained in the grit chamber;
the system comprising:
  a control unit adapted to control the sedimentation of a predetermined size of a sand or grit particle by means of the turbulence creating means and on the basis of at least the water temperature.

Surprisingly it has been found that the velocity of sedimentation of sand and grit in a grit chamber is highly dependent on the temperature of the water in which the sand and grit are suspended. It has been found, that the velocity of sedimentation is higher in the summer and lower in the winter. The consequence, is that the size of particles which settles during summer and during winter are not identical as smaller particles are allowed to settle during summer than during winter. In conventional systems this is not taken into account. Thus, in conventional systems comprising turbulence creating means, said turbulence creating means are operated in the same way all year round and not in response to the change in water temperature.

Moreover it has been found that controlling the grit chamber based on the turbidity is useless if the aim is to allow as much sand/grit as possible to settle, as the turbidity is highly dependent on organic material in the water and thus is not a reliable control parameter.

The system according to the present invention is adapted to take the water temperature into account by operating the turbulence creating means in response to said water temperature so as to maintain the sedimentation at substantially the same level all year round. The effect is, that no or substantially no seasonal fluctuation in the size of the particles which settles in the grit chamber.

In one embodiment the water temperature sensor is arranged and adapted to determine the temperature of the water in the area of the turbulence creating means.

The control unit may be adapted to determine the viscosity of the water on the basis of the temperature determined by means of the temperature sensor. Moreover, the control unit may be adapted to control the sedimentation of a predetermined size of a sand or grit particle by means of the turbulence creating means and on the basis of the determined viscosity.

In the context of the present invention, the term sedimentation shall be understood as the process of settling of a particle onto the floor of the grit chamber.

In the context of the present invention the term "sand" shall be understood as finely divided rock, comprising particles or granules ranging in size from 0.06 to 2 mm.

In the context of the present invention the term "grit" shall be understood as finely divided rock, comprising particles or granules ranging in size from 2 to 10 mm.

In the context of the present invention the term "suspended in water" shall be understood as any particle contained in the water without being settled on the floor below the water e.g. the floor of the reservoir.

In the context of the present invention the term "waste water" shall be understood as any water that has been adversely affected biologically in quality by human activity. In the context of the present invention "waste water" includes liquid waste discharged by domestic residences, commercial properties, industry, and/or agriculture. Waste water also includes raw and processed waste water.

It is the object of the present invention to ensure that sand and/or grit particles larger than a predetermined threshold/size settles on the floor of the reservoir of the grit chamber. In most embodiments the system is operated/controlled such that any or most particle(s) above the threshold settles on the floor of the reservoir. By "most of" is meant that at least 50% of the sand and grit particles larger than the threshold settle(s) during flow of the waste water through reservoir, such as at least 60%, such as at least 70%, such as at least 80%, such as at least 90%, such as at least 95%.

The reservoir is adapted to contain water such as waste water, and defines bottom/floor and one or more sidewalls, such as four sidewalls. In order to allow the waste water to flow into and out of the reservoir, the reservoir defines an inlet and an outlet.

In one embodiment the reservoir defines a V-shaped cross-section allowing sand and grit to settle in the lower part of the V-shaped cross section. In order to allow the sand and grit to be removed from the reservoir, the grit chamber may comprise suction means for removing the sand and grit by suction.

Moreover, the reservoir may be connected to a grit/sand treatment system (e.g. a grit/sand washer and/or a grit/sand classifier), such that sand and grit which has settled on the bottom of the grit chamber is pumped into the grit/sand treatment system. In the sand/grit treatment system, most of the organic material is separated from the sand/grit and may be pumped back into the grit chamber, either directly at a point upstream the grit chamber. The sand/grit remains in the sand/grit treatment system as a residual product.

It will be appreciated that if the turbulence level is lowered in the grit chamber finer/smaller sand/grit particles settles at the bottom of the grit chamber. However, it will also be appreciated that such a decrease in the turbulence level will cause a larger amount of biological material to settle in the grit chamber. The increased level of biological material may be removed in the sand treatment system. However, as any sand/grit treatment system has a maximum capacity, the turbulence level of the grit chamber must be chosen so as to ensure that the maximum capacity of the sand/grit treatment system is not reached.

When setting up the system, the turbulence level of the grit chamber (and thus also the size of the largest particle allowed to pass through the grit chamber) is determined theoretically. Subsequently the turbulence level is decreased, causing even finer sand/grit particles to settle. When the sand/grit treatment system starts to occlude, the capacity of the sand/grit treatment system has been found. Thereupon, the turbulence level of the grit chamber is slightly increased in order to prevent occlusion of the sand/grit treatment system.

In one embodiment the reservoir is elongated and defines two end walls. In the latter embodiment the inlet may be defined on one of the two end walls and the outlet may be defined on the other end wall. In most embodiments the length of the reservoir is at least 2 meters, such as at least 4 meters, such as at least 6 meters, such as at least 15 meters, such as at least 25 meters. In most embodiments, the width of the reservoir is between 2 and 7 meters, such as 3 meters, such as 5 meters. In one embodiment, the depth of the reservoir is determined by use of the following formula:

$$depth = width/0.8.$$

In a further embodiment, the reservoir may by circular and have an outlet provide in the centre of the reservoir. Moreover, the inlet may be defined at one or more positions along the rim of the circular reservoir, such as along the entire rim of the reservoir.

In one embodiment the grit chamber comprises at least one water temperature sensor for determining the temperature of the waste water. In one embodiment the water temperature sensor is arranged to determine the temperature of water contained in the reservoir. The sensor may be positioned in a lower, middle or upper vertical zone of the reservoir such as close to the bottom or the water surface. In one embodiment the water temperature sensor is provided in the inlet and may thus be used to determine the temperature of water flowing into the reservoir. In another embodiment the water temperature sensor is provided in the outlet and may thus be used to determine the temperature of water flowing out of the reservoir. In a further embodiment, the grit chamber comprises a first water temperature sensor provided in the inlet and a second water temperature sensor provided in the outlet. In the latter embodiment the control unit may be adapted to determine an average temperature based on the temperature determined by means of the first and second temperature sensor.

The system comprises a control unit adapted to control the sedimentation of a predetermined size of a sand or grit particle by means of the turbulence creating means and on the basis of the water temperature. The control unit may be adapted to determine the water temperature in real time or at predetermined intervals such as intervals of 1 minute, such as 2 minutes, such as 3 minutes, such as 4 minutes, such as 5 minutes, such as 10 minutes such as every quarter, half or whole hour.

Based on the determined water temperature, the control unit is adapted to operate the turbulence creating means such that if the temperature increases more turbulence is created and such that if the temperature decreases less turbulence is created.

In a one embodiment the system is calibrated and controlled in the following way.

The threshold particle (i.e. the size of the largest particle allowed to be transported through the reservoir) is chosen. Typically the threshold particle is in the range 0.1-0.5 mm. Subsequently, the velocity of sedimentation VS is determined for the threshold particle suspended in water at a given temperature.

Moreover, the axial velocity $V_a$ of the water, i.e. the velocity of the water in the direction from the inlet to the outlet, is determined. Using the two velocities the desired rotational velocity $V_r$ in the grit chamber is determined as a function of the two velocities.

When roots/rotary blowers are used, the control unit may be adapted to control the blower using the following formula $$F_{blower}=K_1+(K_2/n)*V_r^2*(V_r+V_b)$$

wherein
$F_{blower}$ is the frequency, at which the blower is operated,
$K_1$ is a constant depending on the blower and the grit chamber,
$K_2$ is a constant depending on the blower and the grit chamber,
n is the number of blowers,
$V_r$ is the rotational velocity of the waste water and
$V_b$ is the air bubble ascending velocity.

It will be appreciated that $K_1$ and $K_2$ may be determined by operating the blower at different frequencies and determining the resulting rotational velocity in the reservoir whereby two or more equations each with two variables ($K_1$ and $K_2$) are obtained. The value of $K_1$ and $K_2$ may be determined using simple mathematics.

When $K_1$ and $K_2$ are determined the values are inserted into the formula which is then used by the control unit to control the blower.

In one embodiment the control unit comprises a neural network which over time may be taught to operate the turbulence creating means in response to the samples taken and analysed.

In yet another embodiment, a graph or table is generated in which the generated level of turbulence is indicated as a function of one or more of the air temperature, the water temperature and downstream velocity of the waste water. The table/graph may be generated for each grit chamber or generally in a laboratory. In the latter embodiment, the control unit may be adapted to control the diffusers using the table/graph.

In order to create turbulence, the grit chamber comprises a turbulence creating means. The turbulence creating means may comprise a diffuser and/or a means for regulating the velocity of water flowing into and/or out of the reservoir.

In one embodiment, the diffuser comprises a plurality of elongated tubes defining a plurality of nozzles, which may have substantially the same cross-section. It will be appreciated that the smaller the air bubbles generated are, the slower is the ascent speed of the air bubbles. The slower the speed of the air bubble is, the longer it is contained in the water. Thus by expelling a predetermined volume of air as small air bubbles, said predetermined volume of air is contained in the water for a longer period of time than if it had been expelled as larger (and thus fewer) air bubbles.

The turbulence generated by the air bubbles is determined by the volume of water displaced by the air bubbles. Thus, by expelling small air bubbles the power consumption of the system may be reduced. Accordingly, in one embodiment the diffuser is adapted to generate air bobbles having a diameter of less than 3 mm. This may be achieved by providing a diffuser having an outer surface made of a resilient material such as rubber, through which a plurality of passages/nozzles is defined. One such device may be a membrane diffuser such as the STANDARD diffuser or the Magnum® diffuser both by OTT GmbH.

The reservoir may comprise at least one fixture for attachment of the diffuser(s), such as a plurality of fixtures provided along the same sidewall of the reservoir. When diffusers are provided along one of the sidewalls of the reservoir, the flow generated by the air expelled from the diffusers, causes the water to rotate about the longitudinal axis of the reservoir. At the same time water flows from the inlet towards the outlet, and thus the resulting flow pattern defines a helical pattern defining a centre line extending in the longitudinal direction of the reservoir.

In another embodiment two sets of diffusers are provided in the reservoir—one along each of the longitudinal sidewalls of the reservoir. In the latter embodiment two neighbouring helical flow patterns are defined in the reservoir.

In yet another embodiment, one or more diffusers is/are provided centrally (i.e. such that the distance from the diffuser to each sidewall of the grit chamber is substantially identical) and longitudinally in relation to the grit chamber. In the latter embodiment air bubbles exiting the centrally provided diffuser creates two neighbouring flow patterns one on either side of the diffuser.

In one embodiment each of the diffusers are provided at the same distance below the water level such as at a predetermined distance from the bottom of the reservoir.

In one embodiment the diffuser comprises a plurality of diffusers which together define a line of diffusers. Moreover the distance between any two neighbouring diffusers may be below 300 mm, such as below 200 mm, such as below 100 mm, such as below 50 mm, such as below 40 mm, such as below 30 mm, such as below 20 mm, such as below 10 mm. It will be appreciated that the closer the diffusers are provided to each other, the more uniform the rotational turbulence along the reservoir will be. Accordingly, it is desirable that the diffusers are provided as close to each other as possible.

Moreover, the overall length of the diffuser(s) may be above 80% of the length of the reservoir, such as above 90% of the length of the reservoir. In one embodiment the overall length is above 70% of the length of the reservoir, such as in the interval 70-90% of the length of the reservoir.

Alternatively, or as a supplement, the turbulence creating means may be a means for regulating the velocity of water flowing into and/or out of the reservoir. Accordingly, in one embodiment the inlet and/or the outlet comprise(s) a valve adapted to be controlled by the control unit. The valve may be formed as a gate such as a dovetail gate, hinged to a bottom part of the reservoir, the inlet or the outlet. By lowering or raising the gate, more or less water, respectively, may pass through the valve.

In one embodiment the system comprises a velocity sensor for determining the velocity of water flowing into and/or out of the reservoir. Furthermore, the control unit may be adapted to control the sedimentation by means of the turbulence creating means and on the basis of the velocity of the water. Accordingly, in one embodiment the control unit is adapted to control the sedimentation on the basis of both the temperature of the water and the velocity of the water. As described in the aforementioned, the turbulence in the water is influenced by the downstream water flow generated by the water flowing from the inlet towards the outlet, accordingly, in the latter embodiment the control unit is adapted to take the longitudinal and the rotational turbulence into account. The velocity sensor may be provided in or in the vicinity of the inlet. Alternatively, the velocity sensor may be provided in or in the vicinity of the outlet. In one embodiment one or more velocity sensor(s) is/are provided in the reservoir. If more than one sensor is provided, the control unit may be adapted to determine an average velocity.

In a further embodiment the system comprises an air temperature sensor for determining the temperature of air blown out through the diffuser or of air sucked into a blower arranged to blow air out through the diffuser. Moreover, the control unit may be adapted to control the sedimentation by means of the diffuser and on the basis of the air temperature. It will be appreciated that the density of the air blown into the reservoir is dependent on the temperature of the air. Moreover, the density of the air contained in an air bubble of a given size determines the buoyancy of the air bobble. In order to take this into account, the system may in one embodiment comprise a sensor for determining the temperature of air blown out through the diffusers. The air temperature sensor may be provided at any point between an inlet of an air pump and the diffusers. Moreover, in one embodiment the temperature sensor is substituted by an air mass meter.

In one embodiment the system comprises the grit chamber and may thus form a system for separating sand and/or grid from water, the system comprising:
 a reservoir adapted to contain water and defining an inlet and an outlet;
 a turbulence creating means for increasing the turbulence in water contained in the reservoir;
 a water temperature sensor for determining the temperature of water contained in the grit chamber; and
 a control unit adapted to control the sedimentation of a predetermined size of a sand and/or grit particle by means of the turbulence creating means and on the basis of the water temperature.

The invention according to the first aspect may comprise any combination of features and/or elements of the invention according to the second aspect.

In a SECOND aspect the present invention relates to a method of controlling the sedimentation in a grit chamber which comprises:
 a reservoir adapted to contain water and having an inlet and an outlet, and
 a turbulence creating means for increasing the turbulence in water contained in the reservoir,
 a water temperature sensor for determining the temperature of water contained in the grit chamber;
the method comprising the steps of:
 determining the water temperature, and
 operating the turbulence creating means on the basis of the determined water temperature so as to control the sedimentation of sand and/or grit suspended in water contained in the reservoir.

The step for determining may precede the step of operating the turbulence creating means. Moreover, the step of determining and the step of operating may be performed successively. In one embodiment the step of determining and the step of operating is performed at least every minute, such as every two minutes, such as every three minutes, such as every 5 minutes, such as every 10 minutes, such as every quarter, half or whole hour.

In another embodiment the step of determining the water temperature is performed at a lower pace than the step of operating. As an example the step of operating may be performed constantly while the temperature is determined once every minute or at any other of the abovementioned intervals.

The grit chamber may further comprise a velocity sensor for determining the velocity of water flowing into and/or out of the reservoir, such as one of the sensors for determining the velocity of the water described under the first aspect of the invention. Moreover, the method may further comprise the steps of:
 determining the velocity of water flowing into and/or out of the grit chamber, and
 operating the turbulence creating means on the basis of the determined velocity of the water so as to control the sedimentation of sand and/or grit suspended in water contained in the reservoir.

In one embodiment the velocity of the water and the temperature of the water are determined at the same rate/time interval and the turbulence creating means is operated constantly. In another embodiment the water temperature and the velocity of the water are determined successively. In a further embodiment the system is operated in the following cycle: 1) determining the water temperature; 2) determining the velocity of the water; 3) operating the turbulence creating means.

In a further embodiment the turbulence creating means comprises a diffuser comprising an air temperature sensor for determining the temperature of air blown out through the diffuser or of air sucked into a blower arranged to blow air out through the diffuser. Moreover, the method may comprise the step of:
 determining the air temperature of air blown out of the diffuser, and
 operating the turbulence creating means on the basis of the determined air temperature of air blown out through the diffusers so as to control the sedimentation of sand and/or grit suspended in water contained in the reservoir.

In one embodiment the air temperature, the water temperature and the velocity of the water are determined concurrently while in other embodiments they are determined successively. Moreover, one of the three parameters may be determined at a lower pace than the remaining of parameters. The control unit may be adapted to constantly take into account the value of the three parameters and operate the turbulence creating means in response to said values.

The invention according to the second aspect may comprise any combination of features and/or elements of the invention according to the first aspect.

BRIEF DESCRIPTION OF THE DRAWINGS

The invention will now be described in further detail with reference to the drawings in which:
 FIGS. 1-3 disclose a grit chamber,
 FIGS. 4-5 disclose turbulence creating means provided in a grit chamber of a first type,
 FIGS. 6-7 disclose a disclose turbulence creating means provided in a grit chamber of a second type,
 FIG. 8 discloses the effect of providing a plurality of diffusers along one sidewall of a grit chamber,
 FIG. 9 discloses one embodiment of a diffuser,
 FIG. 10 discloses a diagram of the system for controlling the sedimentation, and FIG. 11 discloses the density and dynamic viscosity of water in liquid form.

DETAILED DESCRIPTION OF THE DRAWINGS

Figures 4, 5:
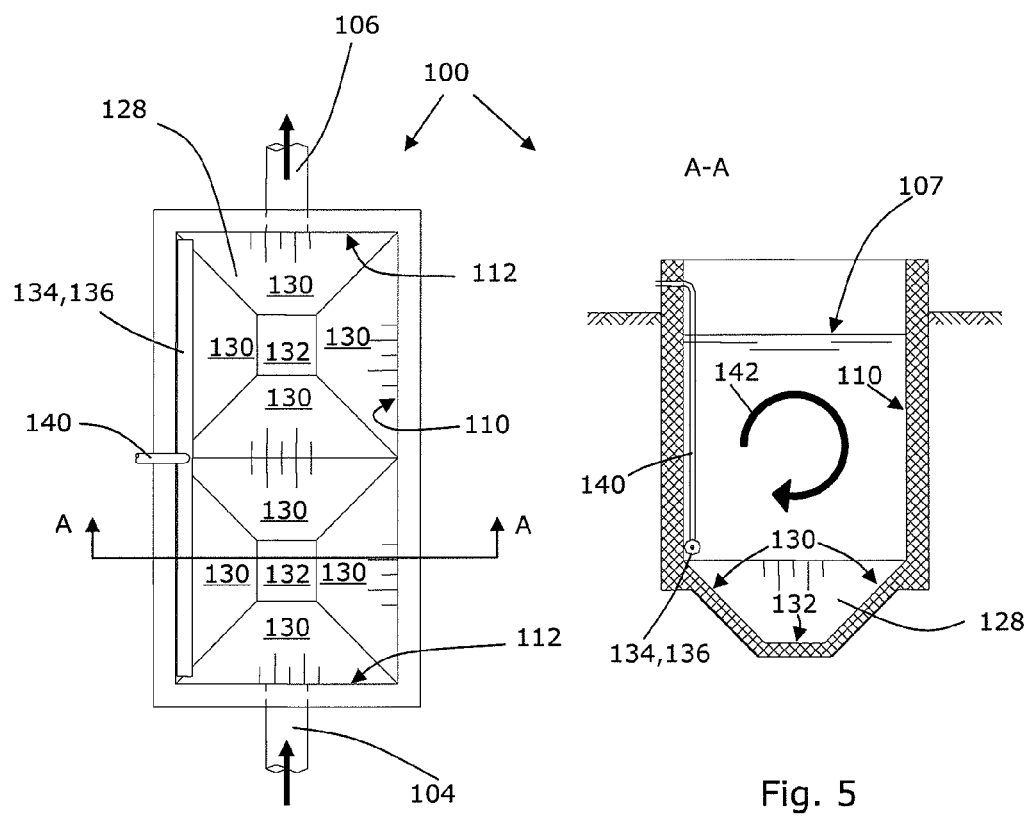

FIGS. 1-3 disclose a grit chamber 100 comprising two reservoirs 102, an inlet 104 and an outlet 106. Each of the reservoirs 102 define a floor 108, sidewalls 110 and end surfaces 112. During use, waste water is supplied through the inlet 104 thus filling a pre-reservoir 114. When the pre-reservoir 114 is filled with waste water, further supply of waste water into the pre-reservoir 114 causes the waste water to flow over first barrier 116 and into the reservoirs 102, which are then filled with waste water. The downstream end surfaces 112 forms part of a valve 118 for adjusting the water level in the reservoirs 102 and for adjusting the downstream velocity of the waste water in the reservoirs 102.

In the embodiment of FIGS. 1-3 the valve 118 is provided in the form of a gate such as a dove tail gate, which is hinged to a bottom surface 120 of the reservoirs 102. The gate may be pivoted about the hinge 122 so as to adjust the water level and so as to adjust the downstream velocity of the waste water. It will be appreciated that the highest possible water level is achieved by positioning the dovetail gate in its vertical position and that by pivoting the dovetail gate in the upstream or downstream direction the water level will be lower.

In other embodiments, the valve 118 may take other forms such as a gate vertically slidable between a lower and an upper position. In the latter embodiment, the water flow increases, the more the gate is elevated and decreases the more the gate is lowered.

When the valve 118 takes the form of a pivotable gate, the waste water exits the reservoirs 102 by flowing over the second barrier 124 and into the outlet 106.

It will be appreciated, that the abovementioned filling of the reservoirs 102 is explained in relation to empty reservoirs 102, and that during normal use, the reservoirs 102 remains filled. Accordingly during normal use, waste water will Flow continuously over the first barrier 116 and into the filled reservoirs 102, while at the same time, waste water flows over the second barrier 124 and out through the outlet 106.

Furthermore it will be appreciated, that the longer the waste water is maintained in the reservoirs 102 the higher the level of sedimentation will be, i.e. the smaller the particles settling on the floor will be. Moreover, it will be appreciated that the level of sedimentation decreases with an increasing level of turbulence in the reservoirs and vice versa. This is used in the present invention to adjust the sedimentation level, and, thus, to ensure that sand and grit particles larger than a predetermined threshold/size settles on the floor 108 of the reservoirs 102, and that corresponding particles below the predetermined size is allowed to leave the reservoir and by being suspended in the waste water leaving the reservoirs 102 through the outlet 106.

In order to determine the velocity of the waste water, the grit chamber 100 comprises flow meters 126 adapted to determine the volume of waste water passing a predetermined point in the reservoir. It will be appreciated that by determining the volume of the water passing the flow meters 126, the velocity may be determined using information about the geometry of the reservoirs 102. In other embodiments, the flow meters 126 may be provided in connection with the inlet 104 or the outlet 106. Alternatively, the grit chamber 100 may comprise flow sensors for determining the velocity of the waste water passing through the inlet 104, the reservoirs 102 or the outlet 106.

FIGS. 4 and 5 disclose an embodiment of the grit chamber 100 defining a reservoir 102. Reference numbers identical to those described in relation to FIGS. 1-3, refer to identical elements/features. For simplicity reasons the pre-reservoir 114, the first barrier 116 and the second barrier 124 are not disclosed in FIGS. 4-5. The floor 108 of the reservoir 102 defines two settling basins 128 each defining four inclined floor surfaces 130 and a lower floor surface 132. Due to the inclined surfaces sand and grit are collected in the lower part of the sedimentation basins 128, by initially covering the lower floor surface 132 subsequently filling the sedimentation basins 128 from below. The advantage of this design is, that it makes removal of the settled sand and grit easier, as the sand and grit will be concentrated in predetermined areas of the reservoirs 102, in which it may be removed e.g. by suction.

Figures 8, 9:
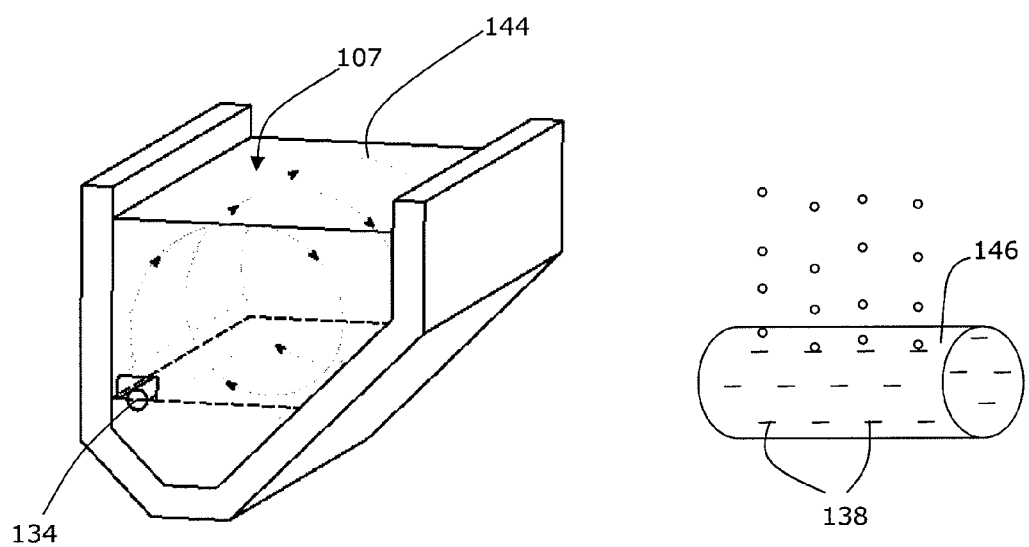

The grit chamber 100 of FIGS. 4 and 5 comprises a diffuser 134 comprising a horizontally extending pipe 136 defining a plurality of nozzles 138 (not visible in FIGS. 4 and 5) such as those disclosed in relation to FIG. 9. A supply line 140 fluidly interconnects to the horizontally extending pipe 136 and a air blower (not visible), thus allowing air to be supplied from the blower into the horizontally extending pipe 136 and out through the nozzles 138. The horizontally extending pipe 136 is positioned substantially horizontally at a predetermined distance below the water level 107. When the diffuser 134 is operated, air bubbles expelled from the diffuser 134 causes the waste water to flow as indicated by arrow 142 whereby the turbulence in the water is increased. As described in the aforementioned the increase in turbulence causes smaller particles such as sand/grit particles and organic particles, to be prevented from settling.

The grit chamber 100 of FIGS. 6 and 7 differs from that of FIGS. 4 and 5 in that only one single settling basin 128 is defined, which extends along the entire length of the reservoirs 102.

FIG. 8 illustrates the turbulence created in a grit chamber 100 of the present invention. When air is expelled from the diffusers, water is displaced in a column above the diffusers; the result is that the pressure in the column decreases. Accordingly when the diffusers are operated, a pressure difference is created in the reservoir, which causes the water to flow in the rotational pattern about the longitudinal axis of the reservoirs 102, as indicated by arrow 142 in FIG. 5. At the same time the waste water flows in the downstream direction towards the outlet 106 (i.e. into the FIG. 5). The result is that the waste water is caused to flow in a helical pattern as indicated by arrow 144 of FIG. 8

One embodiment of the diffuser 134 is illustrated in FIG. 9, wherein the outer surface of at least a part of the diffuser 134 comprises an elastic material 146 defining a plurality of nozzles 138. The nozzles 138 are defined by cutting longitudinal slits through the surface of the elastic material 146. When air is blown into the diffuser 134, the pressurised air is forced out through the nozzles 138 and thus creates air bubbles in the water. For simplicity reasons bubbles are only expelled from some of the nozzles in FIG. 9, but it will be appreciated that air will be expelled from all the nozzles 138.

Figure 10:
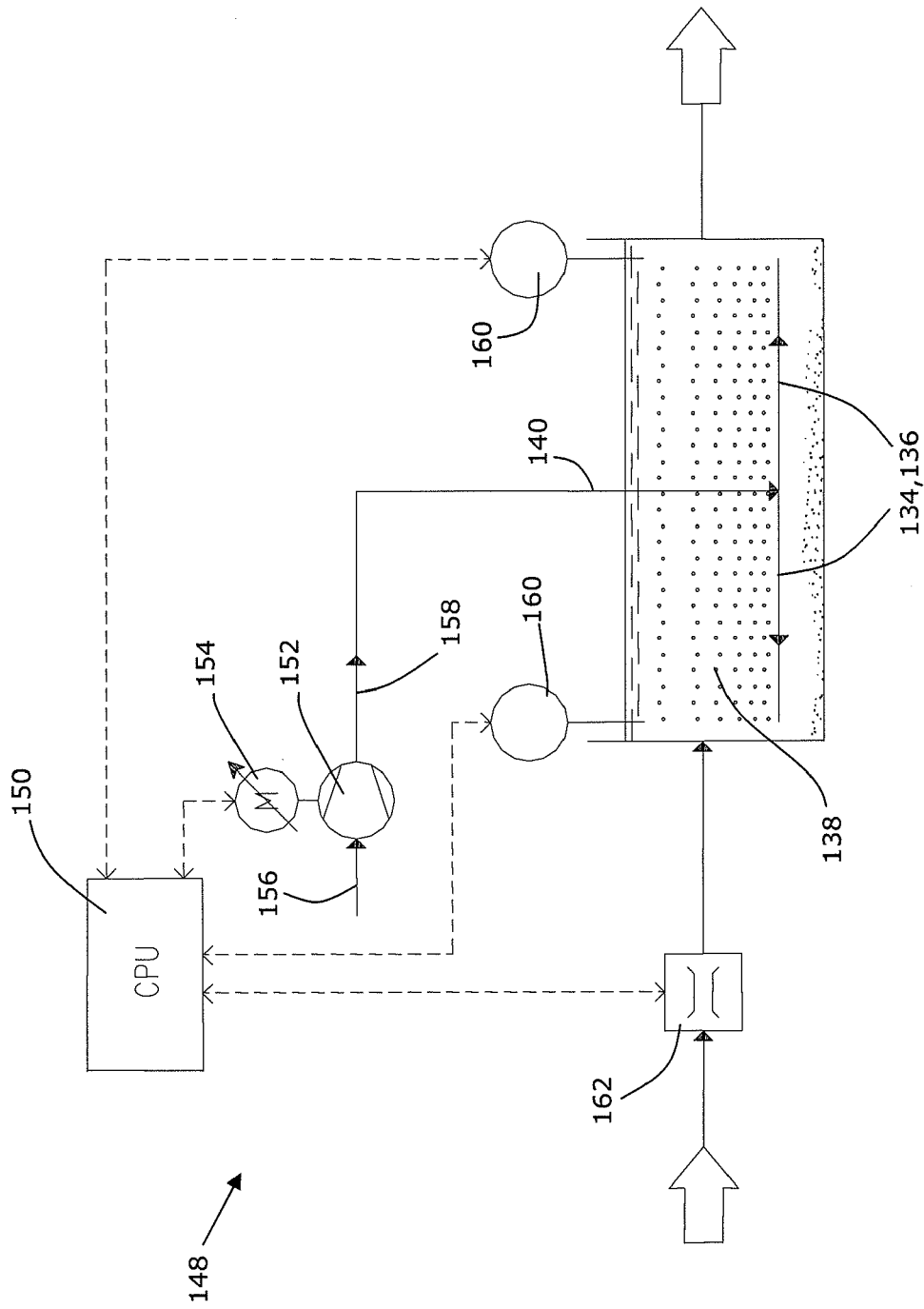

FIG. 10 discloses an electric diagram of the system 148 for controlling the sedimentation in a grit chamber. The system 148 comprises a control unit 150 electrically connected to a blower 152 through a motor 154, such as a frequency regulated electric motor. The blower 152 comprises an inlet 156 for sucking air into the blower 152 and an outlet 158 connected to the supply line 140. As described in above the supply line 140 is connected to the horizontally extending pipe 136, whereby air expelled from the blower 152 causes air bubbles to the generated through the nozzles 138 of the diffuser 134. Moreover, the control unit 150 is connected to a water temperature sensor 160, thus allowing the control unit 150 to determine the temperature of the waste water. Moreover, the control unit 150 is connected to a sensor 162 for determining the downstream flow of the waste water in the reservoir.

The control unit 150 is adapted to determine the temperature of the waste water by means of the water temperature sensor 160 and to determine the downstream velocity of the waste water by means of the sensor 162. Based on at least the water temperature and the velocity of the water the control unit is adapted to determine the frequency at which the blower 152 must be operated in order to ensure that sufficient air is expelled from the nozzles to ensure that the desired level of turbulence is achieved and thus the desired level of sedimentation is ensured. Moreover the control unit 150 is adapted to control the motor such that said desired amount of air is expelled form the motor and thereby the nozzles.

In one embodiment the control unit 150 is adapted to increase the amount of air expelled from the blower 152 if the temperature of the waste water increases and vice versa. Moreover, the control unit 150 may be adapted to decrease the amount of air expelled from the blower 152 if the downstream velocity of the waste water increases and vice versa.

In yet another embodiment, an air temperature sensor (not shown) is arranged to determine the temperature of air sucked into the blower and the control unit 150 is adapted to operate the diffuser 134 on the basis of the air temperature.

Figure 11:
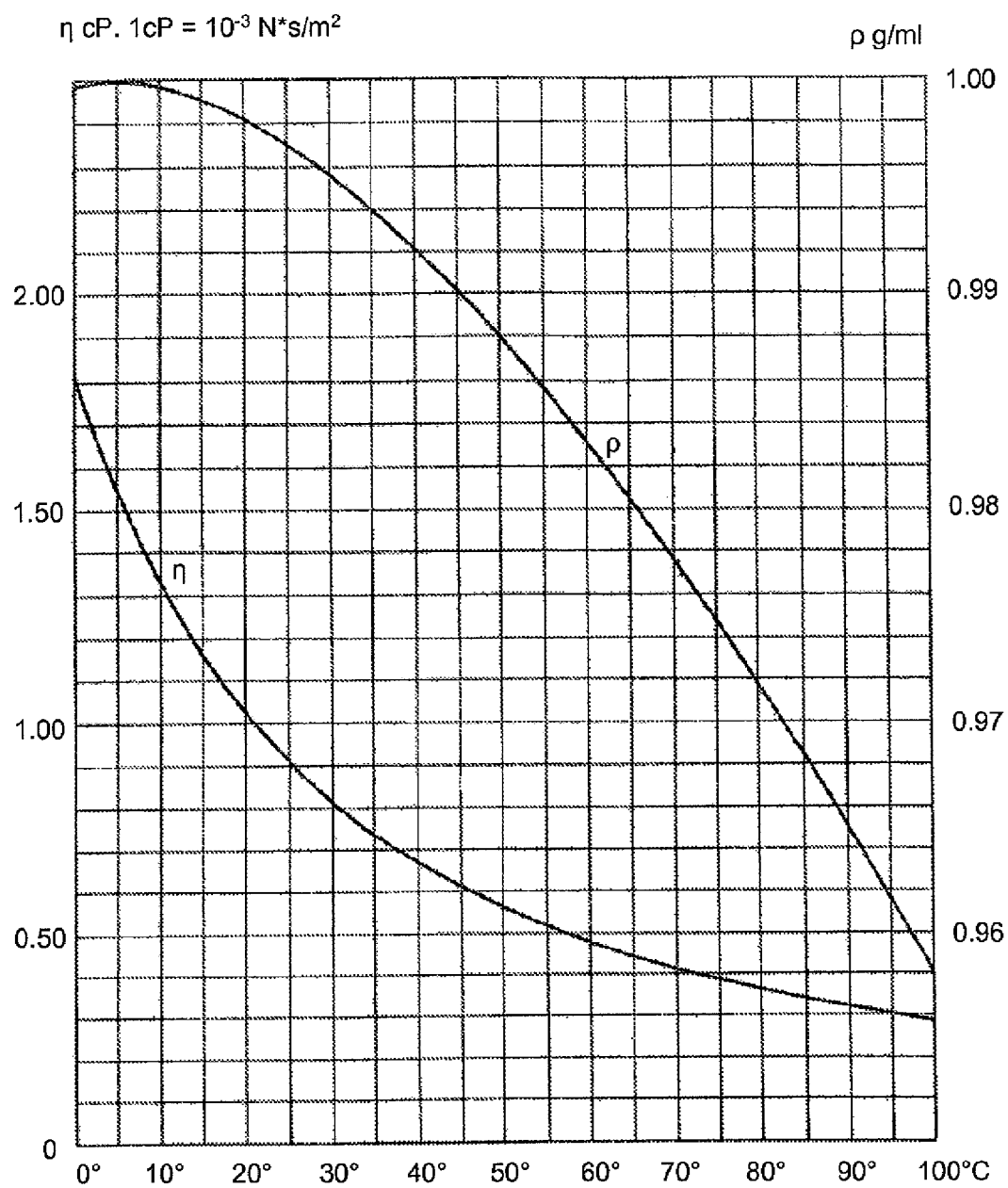

FIG. 11 discloses the density and dynamic viscosity of water which at 1 atm. is in liquid form, i.e. having a temperature in the range of 0 degrees Celsius and 100 degrees Celsius.

From the graph it will be appreciated, that the density ($\rho$) of water is substantially constant in the range of 0-30 degrees Celsius, as the density varies between 0.996 g/ml and 1.000 g/ml in said range. Thus, the variation is 0.998±0.002 g/ml corresponding to ±0.2%.

Moreover, it may be seen form FIG. 11 that the viscosity ($\eta$) fluctuates much more in the same temperature range (0-30 degrees Celsius), as the viscosity varies between 0.8 and 1.8 $10^{-3}$ N*s/m$^2$. Thus the variation is 1.3±0.5 $10^{-3}$ N*s/m$^2$ corresponding to ±38%.

The invention claimed is:

1. A system for controlling the sedimentation of sand or grit particles in wastewater in a grit chamber, comprising:
a reservoir for containing the wastewater and having an inlet and an outlet;
a device for creating turbulence in the wastewater contained in the reservoir, the device for creating the turbulence being configured to increase or decrease the turbulence in the wastewater;
a water temperature sensor for determining the temperature of the wastewater; and
a control unit operatively connected to the device for creating turbulence and operatively connected to the temperature sensor for controlling sedimentation in the grit chamber by increasing the turbulence of the wastewater in the reservoir in response to the temperature of the wastewater increasing and decreasing the turbulence of the wastewater in the reservoir in response to the temperature of the wastewater decreasing;
wherein the device for creating turbulence is an air diffuser.

2. The system of claim 1, wherein the water temperature sensor is positioned in the area of the device for creating the turbulence and wherein the control unit is configured to control the device for creating turbulence based on the temperature of the wastewater in the area where the device for creating the turbulence is located.

3. The system of claim 1, wherein the control unit is operative to determine the viscosity of the wastewater from the determined temperature of the wastewater and wherein the control unit controls sedimentation in the grit chamber by controlling the operation of the device for creating turbulence based in part at least on the determined viscosity of the wastewater.

4. The system of claim 1, wherein controlling sedimentation in the grit chamber includes allowing sand, grit and other solid particles having a size greater than a threshold size to settle in the grit chamber while maintaining sand, grit and other solid particles having a size less than the threshold size to remain suspended in the wastewater.

5. The system of claim 1, further including a velocity sensor for sensing the velocity of the wastewater flowing in the grit chamber and wherein the velocity sensor is operatively connected to the control unit; and wherein the control unit controls the operation of the device for creating turbulence based in part at least on the velocity of the wastewater in the grit chamber.

6. The system of claim 1, wherein the air diffuser is operatively connected to an air blower, and wherein the system includes an air temperature sensor for sensing the temperature of air directed through the diffuser at a selected location; and wherein the control unit controls sedimentation in the grit chamber based in part at least on the temperature of the air.

7. The system of claim 1, wherein the air diffuser is adapted to generate air bubbles having a diameter of less than 3 mm.

8. The system of claim 1, wherein the air diffuser includes a plurality of spaced apart air diffusers located in the reservoir and wherein adjacent air diffusers are spaced apart less than 100 mm.

9. The system of claim 1, wherein the device for creating the turbulence includes one or more air diffusers having a length, and wherein the reservoir includes a length and wherein the length of the one or more diffusers is greater than eighty percent of the length of the reservoir.

10. The system of claim 1, wherein:
controlling sedimentation in the grit chamber includes allowing sand, grit and other solid particles having a size greater than a threshold size to settle in the grit chamber while maintaining sand, grit and other solid particles having a size less than the threshold size suspended in the wastewater;
the system including a velocity sensor for sensing the velocity of the wastewater flowing in the grit chamber and wherein the velocity sensor is operatively connected to the control unit, and wherein the control unit controls the operation of the device for creating the turbulence based in part at least on the velocity of the wastewater in the grit chamber; and
wherein the air diffuser is operatively connected to an air blower having a frequency regulated motor.

11. The system of claim 1 wherein the control unit is adapted for controlling sedimentation in the grit chamber based upon one or more of wastewater flow velocity downstream of the reservoir and air temperature upstream of the device for creating turbulence.

12. The system of claim 1 further comprising a water flow sensor for determining downstream wastewater flow velocity wherein the control unit is operatively connected to the water flow sensor for controlling sedimentation in the grit chamber by decreasing turbulence in the wastewater in response to the downstream wastewater flow velocity increasing and increasing turbulence in the wastewater in response to the downstream wastewater flow velocity decreasing.

13. The system of claim 1 further comprising an air temperature sensor for determining air temperature upstream from the device for creating turbulence and operatively connected to the control unit for controlling sedimentation in the grit chamber by increasing the turbulence of the wastewater in response to the upstream air temperature increasing and decreasing the turbulence in the wastewater in response to the upstream air temperature decreasing.

14. The system of claim 1 wherein the device for creating turbulence comprises a motor-driven blower for directing an amount of air flow from the blower to the diffuser such that air bubbles are generated through nozzles of the diffuser to provide turbulence in the wastewater.

15. The system of claim 14 wherein the controller is adapted to determine a level of turbulence in the wastewater such that sand or grit particles of sizes smaller than a specified threshold size tend to remaining suspension while particles of sizes greater than the specified threshold tend to precipitate or settle out, and wherein the controller is further adapted to determine the required amount of air flow to be directed from the blower to the diffuser and to control the blower so as to provide the required amount of air flow to the diffuser to assure the determined level of turbulence in the wastewater.

16. A method of controlling sedimentation of sand or grit particles in wastewater, comprising:
    directing the wastewater into a reservoir;
    sensing and determining the temperature of the wastewater;
    creating turbulence in the wastewater such that the created turbulence causes at least some of the sand or grit particles to be suspended in the wastewater; and
    controlling the sedimentation of sand or grit particles in the reservoir with a control unit by increasing the turbulence of the wastewater in response to the temperature of the wastewater increasing and decreasing the turbulence of the wastewater in response to the temperature of the wastewater decreasing;
    wherein the turbulence is created by an air diffuser.

17. The method of claim 16, including sensing the temperature of the wastewater in the reservoir in the vicinity of the turbulence.

18. The method of claim 16, further including determining the viscosity of the wastewater and controlling the sedimentation of sand or grit particles in the reservoir with the control unit by controlling the turbulence created in the wastewater based in part at least on the determined viscosity.

19. The method of claim 16, including sensing and determining the velocity of the wastewater flowing into or out of the reservoir, and controlling the sedimentation of sand or grit particles in the reservoir with the control unit by controlling the turbulence in the wastewater based in part at least on the determined velocity of the wastewater.

20. The method of claim 16, wherein the air diffuser is operatively connected to an air blower and is utilized to create turbulence in the wastewater and wherein the method includes determining the temperature of air directed through the diffuser or induced into the air blower; and controlling the sedimentation of sand or grit particles in the reservoir with the control unit by controlling the turbulence created in the wastewater based in part at least on the temperature of the air passing through the air diffuser or the temperature of the air induced into the blower.

21. The method of claim 16, wherein controlling the sedimentation of grit or sand particles includes creating turbulent conditions in the wastewater that results in sand or grit particles of a threshold size or greater settling and sand or grit particles of a size less than the threshold size remaining in suspension.

22. The method of claim 16, wherein creating the turbulence in the wastewater includes directing air from a blower into the air diffuser disposed in the wastewater and directing air from the diffuser into the wastewater to cause the turbulence; and varying the flow of air from the blower to the diffuser based on the temperature of the wastewater including increasing the amount of air dispersed from the diffuser if the temperature of the wastewater increases and decreasing the amount of air dispersed from the diffuser if the temperature of the water decreases.

23. The method of claim 16, including varying the turbulence in the wastewater based on the temperature of the wastewater and including increasing the turbulence in the wastewater in response to the temperature of the wastewater increasing and decreasing the turbulence in the wastewater in response to the temperature of the wastewater decreasing.

24. A system for controlling the sedimentation of sand or grit particles in wastewater, comprising:
    a grit chamber having a reservoir for receiving wastewater, the grit chamber having an inlet and an outlet;
    an air diffuser disposed in the grit chamber for dispersing air into the wastewater and generating turbulence in the wastewater;
    an air blower operatively connected to the diffuser for directing air into and through the diffuser;
    a temperature sensor associated with the grit chamber for measuring the temperature of the wastewater;
    a velocity sensor associated with the grit chamber for sensing the velocity of wastewater passing through the grit chamber;
    a control unit operatively connected to the air blower for controlling the flow of air from the air blower to the diffuser;
    the control unit further being operatively connected to the temperature sensor and the velocity sensor for determining the temperature of the wastewater and the velocity of wastewater passing through the grit chamber;
    the control unit operative to control the sedimentation of the sand or grit particles in the wastewater by controlling the air blower and the amount of air directed from the air blower to the diffuser; and
    wherein the control unit controls the air flow from the air blower to the diffuser: (1) as a function of the temperature of the wastewater by increasing the air flow from the air blower to the diffuser in response to the temperature of the wastewater increasing and decreasing the air flow from the air blower to the diffuser in response to the temperature of the wastewater decreasing or (2) as a function of the velocity of wastewater passing through the grit chamber.

25. The control system of claim 24, wherein the control unit controls the flow of air from the blower to the diffuser as a function of the temperature of the wastewater.

26. The system of claim 24, wherein the control unit controls the sedimentation of the sand or grit particles by:
    increasing the amount of air dispersed from the diffuser if the temperature of the wastewater increases and vice versa, or decreasing the amount of air dispersed by the diffuser if the velocity of the wastewater in the grit chamber increases and vice versa.

27. The system of claim 24, wherein the control unit maintains sufficient turbulence in the wastewater such that fifty percent or more of the sand and grit particles having a size greater than a threshold size settle in the grit chamber.

28. The system of claim 27, wherein the threshold size of particles is approximately 0.1 to approximately 0.5 mm, and the control unit maintains sufficient turbulence in the wastewater such that fifty percent or more of the sand or grit particles having a size greater than the threshold size settle in the grit chamber.

29. The system of claim 24, wherein the air blower includes a frequency regulated motor that is controlled by the control unit such that by controlling the frequency regulated motor, the flow of air from the blower to the diffuser is varied.

* * * * *